United States Patent [19]

Matsuoka et al.

[11] Patent Number: 4,612,041

[45] Date of Patent: Sep. 16, 1986

[54] PROCESS FOR RECOVERING VALUABLE METALS FROM AN IRON DUST CONTAINING A HIGHER CONTENT OF ZINC

[75] Inventors: Toshio Matsuoka; Shinichi Kurozu, both of Niihama, Japan

[73] Assignee: Sumitomo Heavy Industries, Ltd., Tokyo, Japan

[21] Appl. No.: 774,503

[22] Filed: Sep. 10, 1985

[30] Foreign Application Priority Data

Sep. 11, 1984 [JP] Japan .................................. 59-190185
Aug. 29, 1985 [JP] Japan .................................. 60-190153

[51] Int. Cl.$^4$ .............................................. C22B 4/00
[52] U.S. Cl. .......................................... 75/10.14; 75/3; 75/25; 75/10.15
[58] Field of Search ........................ 75/25, 10, 11, 3–5

[56] References Cited

U.S. PATENT DOCUMENTS 3,756,804 9/1973 Stevenson ................................ 75/25
3,945,817 3/1976 Yatsunami ................................ 75/25

Primary Examiner—Peter D. Rosenberg
Attorney, Agent, or Firm—Armstrong, Nikaido, Marmelstein & Kubovcik

[57] ABSTRACT

A process for recovering valuable metals from an iron dust with a high concentration of zinc comprising (1) pelletizing said dust into a pellet in a pelletizer, (2) preheating the resulting pellets by charging a hot gas to remove water, the loss on ignition and carbonaceous materials contained in the pellets, and in case of need, the conditions of gas charged are set up so as to reduce selectively iron oxide while controlling the reduction of zinc oxide practically at zero level, (3) melting and reducing zinc oxide, iron oxide and lead oxide in said pellets in an induction furnace to separate zinc and a part of lead by vaporization and iron and lead by means of the difference in their specific gravities, and collecting zinc and lead as crude ones, iron as molten pig iron and lead as crude one respectively.

2 Claims, 3 Drawing Figures

PROCESS FOR RECOVERING VALUABLE METALS FROM AN IRON DUST CONTAINING A HIGHER CONTENT OF ZINC

BACKGROUND OF THE INVENTION

1. Field of the Invention

This invention relates to a process for recovering valuable metals such as zinc, iron and the like from an iron dust containing zinc therein such as the one generated in an electric arc furnace for steel manufacture or the like.

2. Description of the Prior Art

A dust generated in an iron and/or steel melting furnace such as the electric arc one is collected by means of a dust collector. The amount of the dust generated normally corresponds to 1 to 1.5% by weight of the crude steel manufactured, and the dust contains 25 to 30% by weight of iron, 20 to 25% by weight of zinc and 3 to 4% by weight of lead therein. The present situation is, however, such that it is to be subject to a collective treatment by specific refiners to whom the dust generated is handed over due to unavailability of a proper and easy recovering method thereof which can be operated on a simple and small scale.

Several methods have been proposed such as a rotary blast kiln method and also lately, a treating method using plasma heat. These methods, however, have drawbacks such as the complexity of process, high operation costs or the like.

Therefore, this invention has been completed, taking into consideration such circumstances.

SUMMARY OF THE INVENTION

One object of this invention is to provide a process for recovering easily and economically valuable metals from an iron dust with a high concentration of zinc.

A further object of the invention is to provide a process for recovering valuable metals from said iron dust, which comprises pelletizing the dust into pellets, removing in advance the loss on ignition and solid carbonaceous materials in the pellets at the preheating step, charging the resulting pellets into an induction furnace together with a carbonaceous solid reductant to melt and reduce, and separating zinc by means of vaporization, iron and lead by means of the difference of the respective specific gravities.

A further object of the invention is to provide a process for recovering valuable metals from said dust by prereducing said pellets under the conditions of gas so as to prereduce iron oxide selectively, but control the reduction of zinc practically at zero level after the preheating, thereby the consumption of energy needed in the process can be reduced to a considerable extent.

Further objects of this invention will become apparent from the following description of the invention.

BRIEF DESCRIPTION OF THE DRAWINGS

FIG. 2 is the flow chart for a preferred embodiment of this invention.

Figure 1:
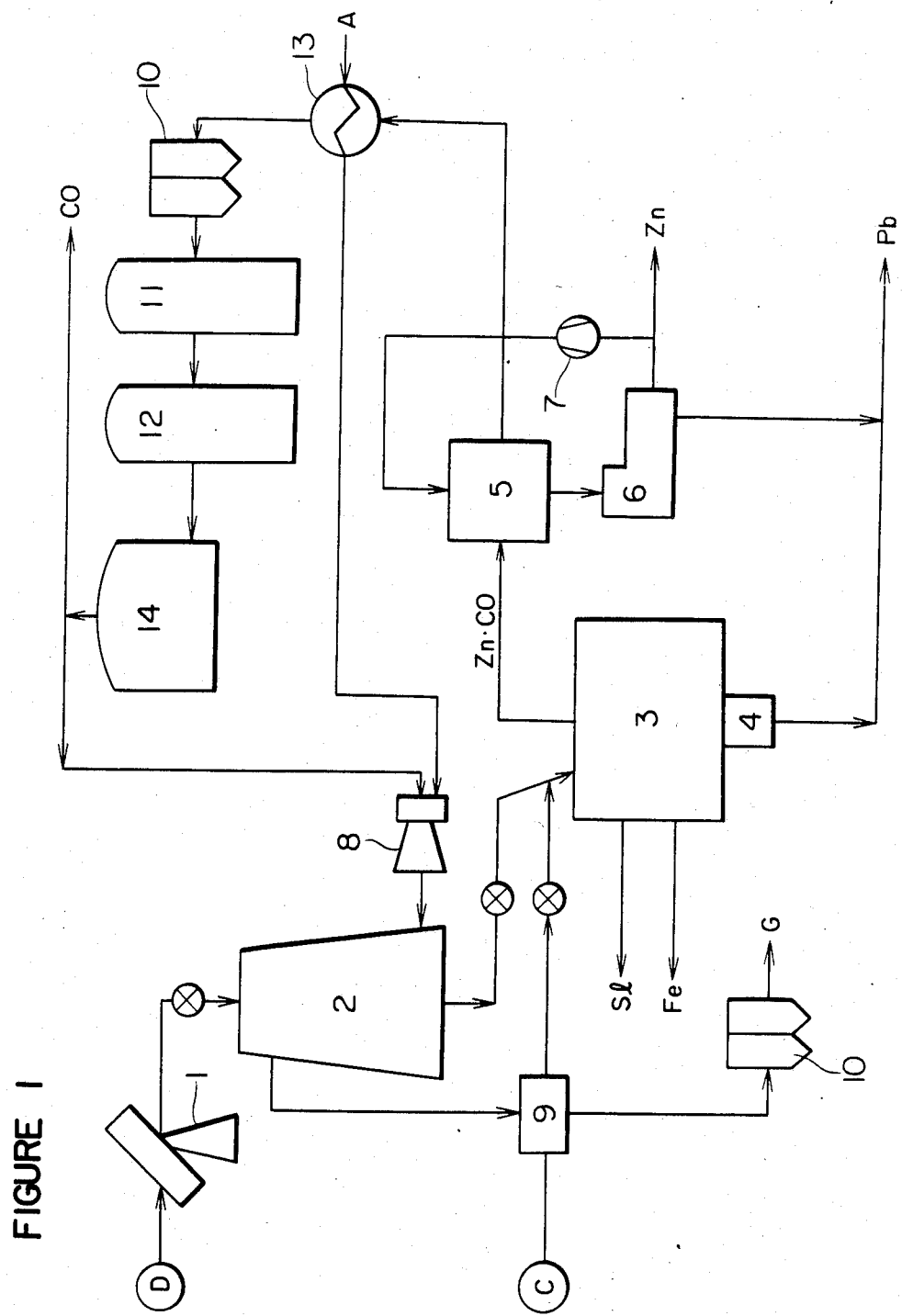
FIG. 1 and FIG. 2 are illustrative examples of the flow charts of apparatuses for the process for recovering valuable metals from a zinc containing iron dust according to this invention. Particularly.
Figure 2:
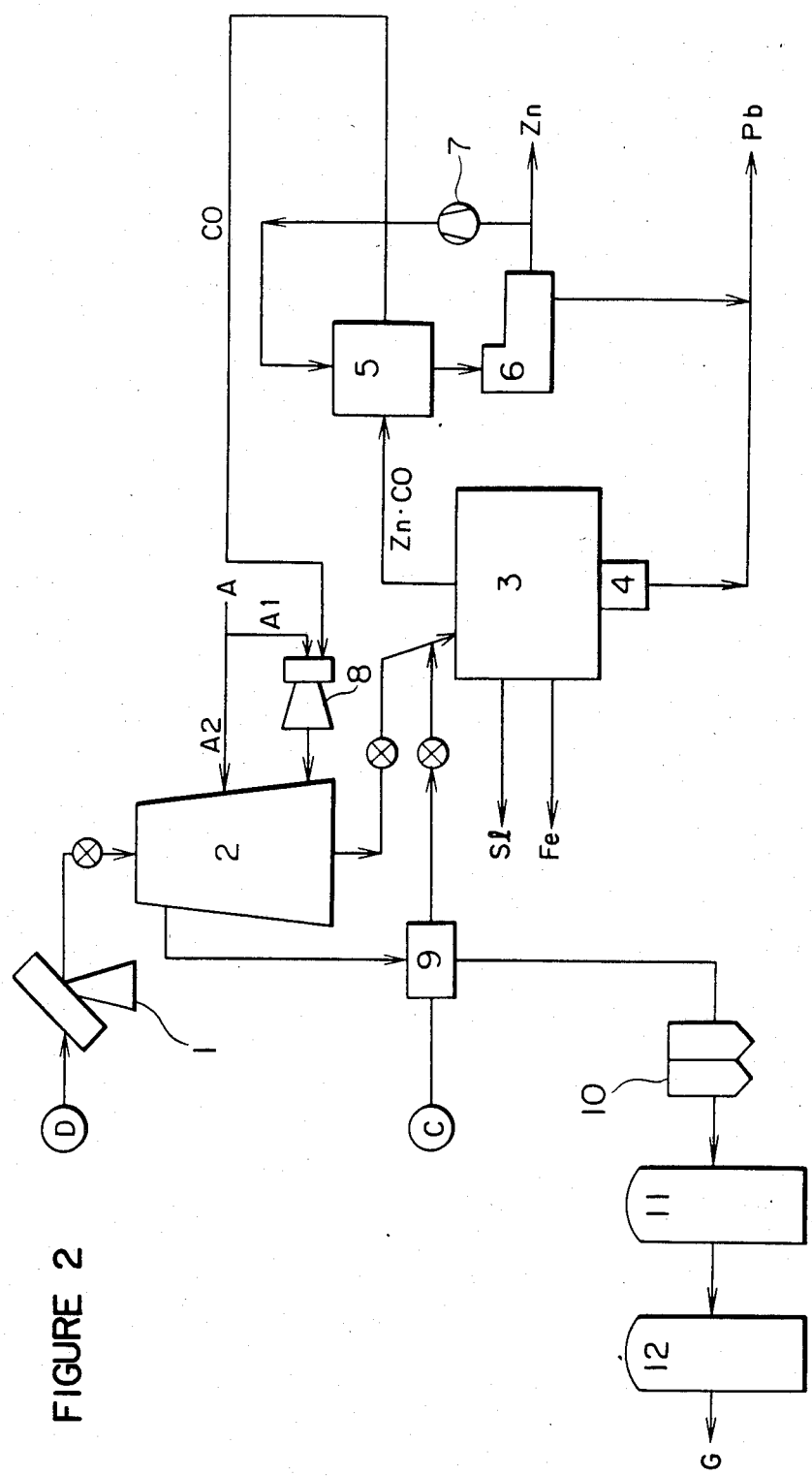

The figures and symbols used in FIG. 1 to FIG. 2 are: 1 ... pelletizer, 2 ... shaft type furnace used for preheating (or preheating and prereducing), 3 ... low frequency induction furnace, 4 ... trap pot for lead, 5 ... condenser for zinc and lead, 6 ... a cooling launder for zinc and lead, 7 ... circulating pump for zinc and lead, 8 ... combustion furnace, 9 ... coke dryer, 10 ... dust collector, 11 ... chlorine scrubber, 12 ... desulfurization unit, 13 ... heat exchanger, 14 ... gas holder, C ... coke, G ... exhaust gas, A, $A_1$, $A_2$ ... air, CO ... carbon monoxide gas, ⊗ charge regulator having reverse-current stopper.

DETAILED DESCRIPTION OF THE PREFERRED EMBODIMENT

This process for recovering valuable metals from an iron dust containing zinc at a high concentration therein comprising, (1) pelletizing the dust into pellets with a pellitizer 1, (2) preheating the pellets in a shaft type furnace 2 for drying them, removing the loss on ignition and burning solid carbonaceous materials in the pellets to remove the materials by means of a hot gas charged from a furnace 8, (3) charging the resulting pellets into an induction furnace 3 together with a carbonaceous solid reductant, (4) melting and reducing iron oxide, zinc oxide and lead oxide contained in said pellets in the induction furnace 3 with said solid reductant, thereby reduced zinc and a part of reduced lead are vaporized, (5) separating zinc and lead in a gaseous state by vaporization, condensing them by a condenser 5 to obtain crude zinc and lead, and (6) separating iron and lead by means of the difference of their specific gravities to obtain molten pig iron and crude lead in the induction furnace 3, respectively. Thus, the valuable metals such as iron, zinc, lead and the like are recovered easily with a lower energy consumption.

If a shaft type furnace consisting of two zones; one is installed in the upper part, and the other is installed in the lower part is employed, this process can be carried out more efficiently, thereby the valuable metals are obtained more efficiently. That is, the pellets are charged into the shaft type furnace having said two zones, and the charged pellets are dried and preheated in the preheating zone in the upper part, and the preheated pellets are going down naturally and then prereduced in the prereducing zone in the lower part by means of the exhaust gas from an induction furnace 3. Especially, the conditions of gas in the prereducing zone is regulated by the ratio of $CO_2$ to CO at a combustion furnace 8 so as to control the reduction of zinc oxide as low as possible but prereduce iron oxide selectively. After the prereducing process is over, thus treated pellets are charged together with a carbonaceous solid reductant to the induction furnace; and zinc, iron and lead are recovered in the same manner as described above.

As a pelletizer, any type of the pelletizers can be used as far as it can manufacture pellets having a size of 6-15 mm. However, a pan type or a drum type pelletizer is usually employed.

A proper amount of water is added to the dust during a process. Normally, the amount of water to be added should be regulated in such a range that the water content in the pelletilized dust is approximately 8 to 10% by weight.

The best mode of this process wherein the preheating and prereducing step is employed will be elucidated as follows. A preheating (including drying of pellets) and prereducing furnace, any type of shaft type furnaces having two tuyeres can be employed.

The temperature of the hot gas to be charged into the preheating and prereducing furnace is 800° to 1,000° C.

Additionally, this process can be carried out more economically if the conditions of gas to be charged into the preheating and prereducing furnace are controlled within the region shown by hatching which are surrounded by each equilibrium curve of $FeO+CO=Fe+CO_2$, $C+CO_2=2CO$ and $ZnO+CO=Zn+CO_2$.

In this process, the reducing gas generated in the induction furnace is also recycled to generate the hot gas for preheating and prereducing step in the shaft type furnace, in the way as shown in FIG. 2.

For this purpose, the reducing gas is partially burnt in the furnace. An oxygen gas enriched air may be used therefor as required.

As a representative example of a carbonaceous solid reductant, coke can be given, however, an equivalent thereof can be also used.

Zinc is separated and recovered by vaporizing it, taking advantage of its easily vaporizable nature at a relatively lower temperature due to its lower boiling point; sending zinc in a gaseous state together with the reducing gas to a condenser in which zinc is condensed.

In case of iron and lead, they are separated by using the difference of the specific gravities in the molten state in the induction furnace and recovered as molten pig iron and crude lead, respectively.

Thus, this invention has the following advantages:

(I) Valuable metals can be easily recovered; because the induction furnace is suitable for melting, reducing the pellets and vaporizing zinc since the furnace has a high stirring power and it can be simply constructed so as to keep its body gastight.

(II) The bursting hardly occurs when the pellets are charged into molten iron in the furnace because the loss on ignition has been removed in advance. Thus, the operation with a stable molten iron can be achieved and the generation of the dust can be reduced, too.

(III) The preheating can be attained in advance by burning the carbonaceous material in the pellets. Additionally, the reduction of the metal oxides in the induction furnace occurs only in the surface of pellets because the carbonaceous materials needed as a reductant is supplied from not the carbonaceous materials existing in the pellets, i.e., internal carbon, but those in molten iron in the furnace. Therefore, the abrupt gas generation at the time of exposing suddenly the pellets with internal carbon to a high temperature and the subsequent bursting of pellets can be prevented, and the bumping of molten iron and the generation of a dust can be reduced. Thus, the stable operation with a stable molten iron can be attained.

(IV) Iron portion is recovered as molten pig iron, and if the formed molten pig iron is charged as it is to an electric arc furnace in the subsequent step, the sensible heat of the molten pig iron can be utilized effectively.

(V) The reducing gas generated in the induction furnace can be utilized as an energy source off-site of this process and/or preheating the combustion air by means of a heat exchanger; said gas is burnt to be used as heating medium for the preheating (including drying) step, thereby the valuable metals can be recovered by consuming less energy.

Particularly, the following advantages are also attained in the case that the preheating and prereducing step is employed in the process:

(I) The electric power consumption of the induction furnace can be reduced because of prereducing iron oxide in the shaft type furnace prior to the charge of the pellets to said induction furnace.

(II) The lifetime of the refractory used for the induction furnace can be prolonged according to the invention because the content of FeO in the pellets which deteriorates the lifetime of the refractory is decreased.

(III) If the conditions for the gas to be charged to the shaft type furnace are set up within a range surrounded by the equilibrium curve of $ZnO+CO=Zn+CO_2$ corresponding to the partial pressure of Zn and those of $FeO+CO=Fe+CO_2$ and $C+CO_2=2CO$, the concentration of zinc being contained in the gas which has just passed the prereducing zone of the shaft type furnace can be expected to be practically zero even in either zinc or zinc oxide because the pressure of CO in the gas ascending in the interior of the furnace while reacting therein would be lowered to a considerable extent and the temperature of the gas will be lowered, thereby the possibility of the existence of either zinc or zinc oxide in the gas will become negligible since possibly vaporized zinc in the prereducing zone will be reoxidized in the preheating zone and descend again; provided that the partial pressure of CO in the gas and its temperature be set up so as to correspond to 0.02 atmospheric pressure of Zn at the spot near to the bottom of the shaft furnace where the partial pressure of CO is the highest—because the operation in the prereducing zone of the shaft furnace is carried out under such conditions that the reduction of zinc oxide is controlled as low as possible and that of iron oxide is selectively carried out.

If the reduction of charged materials is carried out only in the induction furnace, an excess gas will be generated in a considerable amount.

If, as is embodied by the invention, the gas generated in the induction furnace is used as gaseous reductant in the lower part of the shaft furnace to prereduce said pellets prior to charging them into the induction furnace, and further the gas used for said prereduction of the pellets is burnt in the upper part of the shaft type furnace by introducing combustion air from outside to preheat the pellets beforehand, thereby not only the effective utilization of excess gas is achieved, but also the gas generation in the furnace itself is decreased.

The process according to this invention is illustrated by the following Examples, but is not limited thereto.

EXAMPLE 1

(Used the Apparatus Shown in FIG. 1)

The dust collected in an electric furnace was pelletized into pellets having a size of 6–15 mm by a pelletizer 1. Thus obtained pellets were charged into a shaft type furnace 2, dried and preheated therein by a hot gas having a temperature of 800° to 1000° C.

Water contained in the pellets was removed at the upper part of the furnace, and then the loss on ignition was also removed at the lower part while going down to the bottom of the furnace. At the same time, the solid carbonaceous materials contained in the pellets were burnt and removed as well. As the result, the combustion of the carbonaceous materials was used for preheating.

As the preheated pellets were charged into a lower frequency induction furnace 3 together with coke C, zinc oxide, iron oxide and lead oxide in the pellets were reduced and molten therein and the remaining metal oxides formed slag Sl.

The reduced iron was discharged as a molten pig iron Fe (contained about 4% of carbon) from the furnace 3 and charged as it was into an electric arc furnace.

The formed slag was discharged together with molten iron while feeding power to the furnace and stirring molten burden, or the molten iron and slag were taken out separately from the different outlets after stopping power feed.

The reduced lead Pb was separated in the induction furnace by means of the difference of the specific gravity from molten iron, and stored in a trap pot 4 from which lead was periodically taken out as crude one.

The reduced zinc was vaporized due to its relatively lower boiling point, led to a condenser 5 together with the reducing gas CO in a gaseous state, condensed into a liquid zinc, and settled in a cooling launder 6 with the co-vaporized reduced lead. After that, the reducing gas was sent to a gas holder 12 through a dust collector 10, a chlorine scrubber 11 and a desulfurization unit 12 after exchanging its heat at a heat exchanger 13 with the combustion air. From the gas holder, a part of the reducing gas was sent to a combustion furnace 8 as a fuel for obtaining a hot gas for drying and preheating pellets.

The air preheated at the heat exchanger 13 was also sent to the furnace 8 for combustion of the reducing gas CO.

Furthermore, the exhaust gas from the furnace 2 was led to a coke dryer 9 and utilized for drying coke. Thereafter, the gas was discharged through the dust collector 10 outside the plant.

EXAMPLE 2

(Used the Apparatus Shown in FIG. 2)

The pellets pelletized from the dust D were charged into the shaft type furnace 2 which has two zones—one is a preheating (including drying) zone installed in the upper part of the furnace and the other is a prereducing zone in the lower part of the furnace. In the preheating zone, the pellets were heated in a short time by burning CO in the gas ascending the prereducing zone, and burning internal carbon in the pellets with the air $A_2$, and, if necessary, the air was enriched with oxygen. In this preheating zone, water and the loss on ignition contained were also removed.

Figure 3:
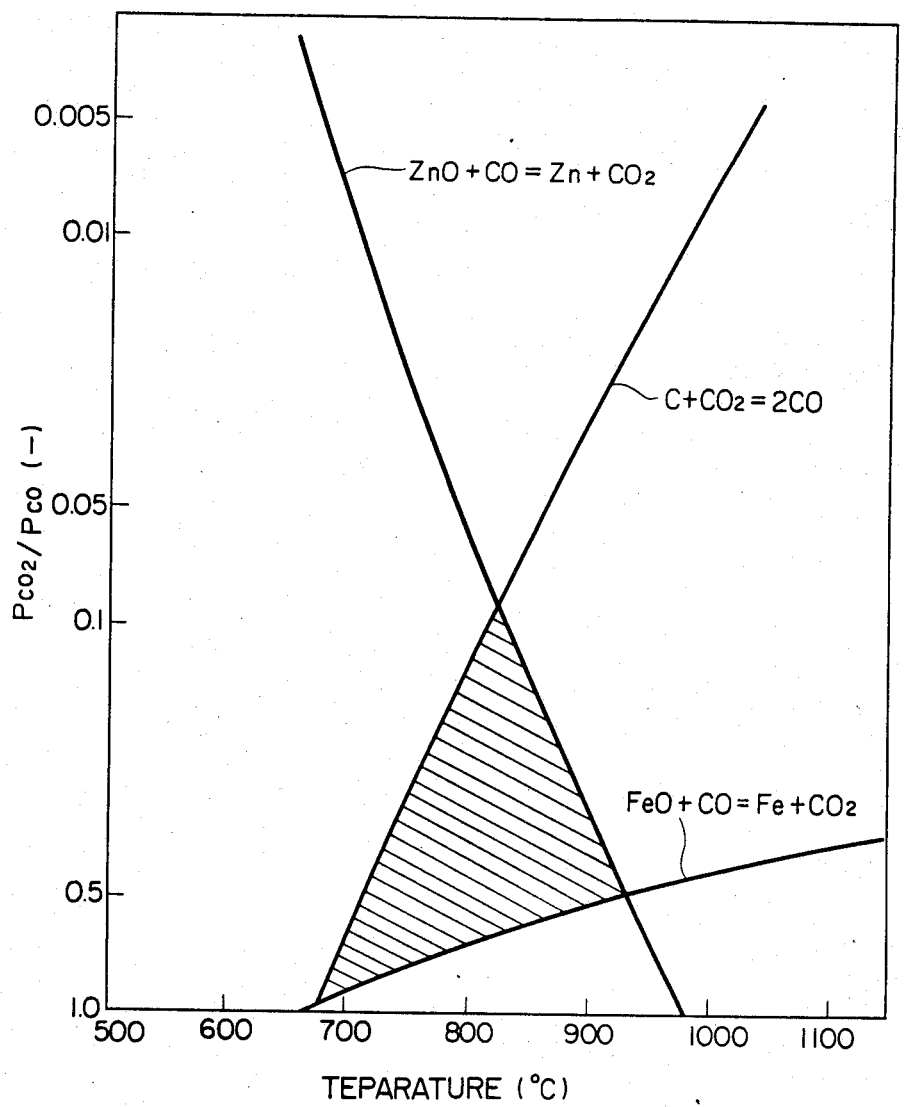
FIG. 3 shows a diagram for the conditions of gas to be charged into a prereducing zone in a shaft type furnace 2 in FIG. 2. The region shown by hatching illustrates the most preferred conditions for gas for the preheating and prereducing step of this invention, which is surrounded by the equilibrium curves of $ZnO + CO = Zn + CO_2$, $C + CO_2 = 2CO$ and $FeO + CO = Fe + CO_2$ when the pressure of zinc and those of carbon monoxide and carbon dioxide are set up at 0.02 and 0.98 atmospheric pressures, respectively. However, for a purpose of simplifying the matter, other gas components expected in the practical case were omitted in this diagram.

The preheated pellets were then going down to the prereducing zone of the furnace 2, and subject to reaction with the reducing gas provided from a furnace 8 for regulating the conditions of gas to prereduce iron oxide selectively. The conditions were regulated within the range surrounded by the equilibrium curves of $FeO + CO = Fe + CO_2$ and $C + CO_2 = 2CO$ for the selective reduction of iron oxide. It was preferred to set up the conditions in a range shown by hatching in FIG. 3 which is formed when the equilibrium curve of $ZnO + CO = Zn + CO_2$ is added to said two curves by setting the pressure of vaporized zinc at 0.02 atmospheric pressure, for example, to control the reduction of zinc oxide practically at zero level.

Then, prereduced pellets were charged into the induction furnace 3 together with coke C dried in the coke dryer 9. Thereafter, the repetition of the procedures of Example 1 gave zinc, iron and lead, respectively.

The reducing gas CO passed through the condenser 5 was led to the furnace 8. In this furnace, the reducing gas was partially burnt with the air, if required, oxygen gas-enriched air so as to meet the aforementioned conditions of gas for selective prereduction of iron oxide.

The exhaust gas G was discharged outside the plant through the dust collector 10, the scrubber 11 and the desulfurization unit 12 after having been utilized for drying coke C in the dryer 9.

What is claimed is:

1. A process for recovering valuable metals from an iron dust containing zinc at a high concentration therein comprising:
   (1) pelleting the dust into pellets with a pelletizer 1;
   (2) preheating the pellets in a shaft type furnace 2 for drying them, removing the loss on ignition and burning solid carbonaceous materials in the pellets to remove the materials by means of charging a hot gas from a furnace 8;
   (3) charging the resulting pellets into an induction furnace 3 together with a carbonaceous solid reductant;
   (4) melting and reducing iron oxide, zinc oxide and lead oxide contained in said pellets in the furnace 3 with the solid reductant so that reduced zinc and a part of reduced lead are vaporized and sent to a condenser 5;
   (5) separating zinc and lead in a gaseous state by condensing them by the condenser 5 to obtain crude zinc and lead; and
   (6) separating iron and lead by means of the difference of their specific gravities to obtain molten pig iron and crude lead in the induction furnace 3, respectively.

2. A process for recovering valuable metals according to claim 1 wherein the shaft type furnace 2 is the one having a preheating zone in its upper part, and having a prereducing zone in its lower part in which the prereducing is conducted in such gas conditions that the reduction of iron oxide is selectively carried out but the reduction of zinc oxide is controlled as low as possible by means of charging the hot gas from the furnace 8 which can regulate said gas conditions.

* * * * *